F. AND M. WELLS.
SPLIT RIM.
APPLICATION FILED MAR. 8, 1921.
1,398,659.
Patented Nov. 29, 1921.
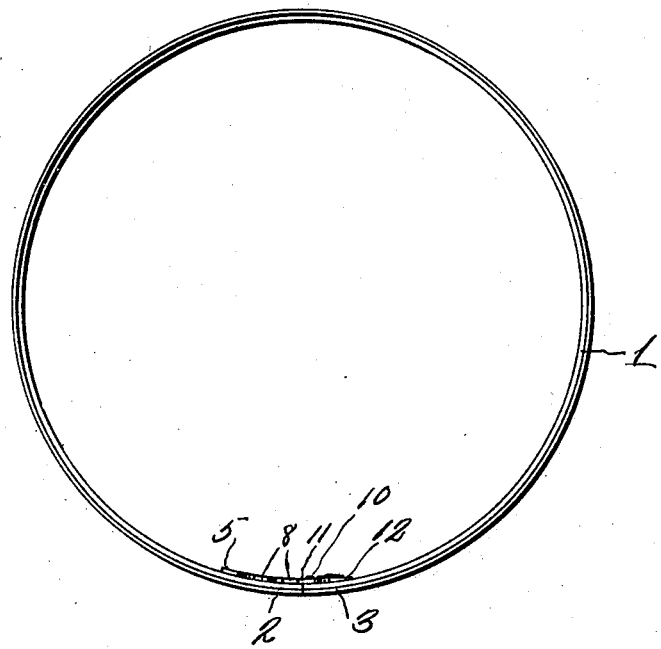
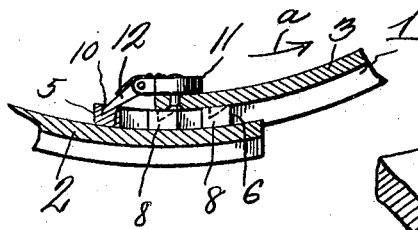
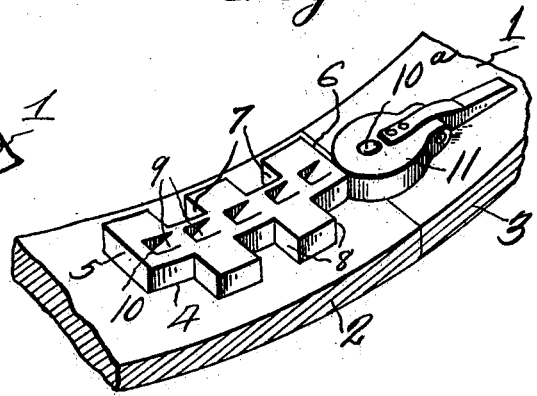
Inventors
Fred Wells
and Martin Wells
By D. Luift
their Attorney

UNITED STATES PATENT OFFICE.

FRED WELLS AND MARTIN WELLS, OF TOWANDA, PENNSYLVANIA.

SPLIT RIM.

1,398,659.  Specification of Letters Patent.  Patented Nov. 29, 1921.

Application filed March 8, 1921. Serial No. 450,784.

*To all whom it may concern:*

Be it known that FRED WELLS and MARTIN WELLS, citizens of the United States, residing at Towanda, in the county of Bradford and State of Pennsylvania, have invented certain new and useful Improvements in Split Rims, of which the following is a specification.

The invention relates to demountable rims of the split rim type and has for its object to provide adjacent one end of the split rim a plate having notches, with which notches a dog of a pivoted member carried by the other end of the split rim coöperate, said dog being intermittently movable in the notches. Also to provide the opposite sides of the plate with notches in staggered relation to each other in which notches an instrument may be placed for intermittently forcing outwardly the end of the split rim having the pivoted member and the pivoted dog, during which movement said dog is intermittently moved in the notches of the plate.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the demountable rim showing the same in expanded condition.

Fig. 2 is a detail sectional view through the adjacent ends of the demountable rim, showing the ends overlapped as they are when the rim in contracted.

Fig. 3 is a detail perspective view of the adjacent ends of the rim after the rim has been expanded.

Referring to the drawings, the numeral 1 designates a conventional form of split ring and 2 and 3 the abutting ends thereof. Welded or otherwise secured at 4 to the end 2 of the rim is a plate 5, said plate having its end 6 slightly spaced from the end of the rim on which it is secured. Plate 5 on opposite sides thereof is provided with a plurality of notches 7 and 8, the notches on each side being in stepped relation to the notches on the other side, the purpose of which will presently appear. Plate 5 at a point substantially centrally thereof is provided with a plurality of depressions 9 forming ratchet teeth, said depressions have their ends 10 substantially centrally disposed in relation to the notches 7 and 8 of the plate. Pivotally secured as at $10^a$ to the end 3 of the rim is a pivoted member 11, which member is so pivoted that when the ends 2 and 3 are in abutting engagement a portion of the pivoted member will overlie the end 2 of the rim and limit the outward movement of the end 3. When the rim is contracted and the ends 2 and 3 overlapped as shown in Fig. 2, it will be seen that the plate 5 is beneath the end 3 of the rim. When in this position the pivoted member 1 which is provided with a spring actuated dog 12 is so positioned that the dog 12 will engage one of the notches 10, said dog being proportioned so that the end 3 of the rim will register with one of the notches 7 or 8, thereby allowing the insertion of a tool in one of the notches and the end 3 to be forced in the direction of the arrow *a* until the dog 12 enters the adjacent notch 10, at which time the tool may be removed from one of the notches and placed in the adjacent notch which is uncovered, said operation being repeated until the ends 2 and 3 are in position to be forced into abutting engagement as shown in Figs. 1 and 3, at which time the pivoted member 11 is moved to the position shown in Fig. 3 and the ends forced into abutting engagement in such a manner that one side of the pivoted member will engage the upper side of the end 2 and prevent further outward movement of said end.

From the above it will be seen that a rim expanding device for a split rim is provided which expanding device is simple in construction and so constructed that the rim may be easily and quickly expanded, thereby obviating the difficulty now experienced in expanding split rims.

The invention having been set forth what is claimed as new and useful is:—

1. The combination with adjacent abutting ends of a split rim, of means for forcing said ends into abutting engagement from an overlapped position, said means comprising a plate carried by one of said ends and provided with oppositely arranged notches, a dog carried by a pivoted member on the other abutting end and coöperating with depressions in the plate, said dog and depressions forming means whereby the overlapped ends may be moved in opposite directions intermittently by a tool when said tool is inserted in the oppositely arranged notches of the plate.

2. The combination with the adjacent abutting ends of a split rim, of means for forcing said ends in opposite directions and into abutting engagement with each other from an overlapped position, said means comprising a plate secured to one of the ends, the sides of said plate being provided with a plurality of spaced lugs, the lugs of one side being in staggered relation to the lugs of the other side, a member pivoted to the other end of the rim, said pivoted member extending beyond the end of said end of the rim, a spring actuated dog carried by said pivoted member, a plurality of notches in the upper face of the plate, the forward ends of which are in registration with a substantial center of the lugs of said plate and with which forward ends the spring actuated dog coöperates for holding the ends of the rim in various positions when an intermittent movement outwardly is imparted to the end of the rim having the pivoted member by inserting a tool behind the lugs carried by the plate and in engagement with the overlapped end and forcing said overlapped end outwardly.

In testimony whereof we affix our signatures.

FRED WELLS.
MARTIN WELLS.